(12) United States Patent
Hurt

(10) Patent No.: US 8,826,808 B2
(45) Date of Patent: Sep. 9, 2014

(54) FIRE FISHING DEVICE

(76) Inventor: Robert S. Hurt, Becker, MN (US)

(*) Notice: Subject to any disclaimer, the term of this patent is extended or adjusted under 35 U.S.C. 154(b) by 50 days.

(21) Appl. No.: 13/594,925

(22) Filed: Aug. 27, 2012

(65) Prior Publication Data

US 2013/0052322 A1 Feb. 28, 2013

Related U.S. Application Data

(60) Provisional application No. 61/527,274, filed on Aug. 25, 2011.

(51) Int. Cl.
*A47J 37/04* (2006.01)
*A47J 43/00* (2006.01)

(52) U.S. Cl.
USPC .................................. 99/419; 294/8; 294/175

(58) Field of Classification Search
CPC ......... A47J 43/18; A47J 43/28; A47J 43/288; A47J 43/00; A47J 2037/0795; A47J 37/0694; A47J 37/04; A47J 33/00

USPC ........... 426/523; 99/421 A, 421 HV, 421 HH, 99/421 R, 409, 394; 294/8, 175; 126/25 R, 126/30; 248/297.11; D7/684

See application file for complete search history.

(56) References Cited

U.S. PATENT DOCUMENTS

| | | | | |
|---|---|---|---|---|
| 2,535,548 | A | * | 12/1950 | Porter ......................... 99/421 A |
| 2,934,849 | A | * | 5/1960 | Kampa .............................. 43/17 |
| 3,720,157 | A | * | 3/1973 | Van Bergen ................ 99/421 H |
| 3,745,910 | A | * | 7/1973 | Delamater ...................... 99/419 |
| 4,517,885 | A | * | 5/1985 | Thompson ............... 99/421 HV |
| 6,073,546 | A | * | 6/2000 | Alcorn ............................ 99/427 |
| D681,402 | S | * | 5/2013 | Hurt .............................. D7/684 |

* cited by examiner

*Primary Examiner* — Steven Leff
(74) *Attorney, Agent, or Firm* — Geiser Law, PLLC; Greg N. Geiser

(57) ABSTRACT

A device for roasting food of fire, the device designed to mimic a fishing pole and having a rod, a wire, and a flipping mechanism. The wire is attached to an end of the rod and extends a fixed length culminating in a bifurcation at its end. The bifurcation includes apertures to receive a shaft of the flipping mechanism. The flipping mechanism includes a pair of rails and skewers located at the ends of the shaft and a weight centrally located on the shaft between the bifurcation, wherein the weight acts as a counter balance to flip the flipping mechanism when the rod is moved up and down or tilted.

11 Claims, 2 Drawing Sheets

FIRE FISHING DEVICE

CROSS REFERENCE TO RELATED APPLICATIONS

This application claims the benefit of U.S. Provisional Patent Application Ser. No. 61/527,274 filed 2011 Aug. 25 to the above named inventor.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The present invention relates to a food roasting device for roasting foods over a fire.

BACKGROUND OF THE INVENTION

Roasting marshmallows, hot dogs, or other food items over an open fire has been a backyard or campsite pastime enjoyed by generations of individuals. Typically, to roast food over a fire or other heat source, an individual will utilize a long stick, an extended fork, or a specially designed roasting implement. To evenly cook the food, the individual will slowly turn the implement over to ensure even cooking to all sides of the food. Often, this constant rotation can be tedious and difficult for children and adults to master. Therefore, there exists a need for a food roasting device that easily rotates the food for even cooking and that is fun for the user.

SUMMARY OF THE INVENTION

A fire fishing pole device according to the present invention is disclosed to easily turn food items for even cooking. The device is designed to mimic a fishing pole and to be a fun and enjoyable activity for those enjoying outdoor cooking. The device includes a rod, a wire connected to the rod, and a flipping mechanism connected to the wire opposite the rod.

The rod includes a first end having a handle and a second end opposite the first end, the second end having a notch and a fastener. In the preferred embodiment of the present invention, the handle is composed of wood so as to not get hot, although materials that are resistant to heat may be used as well such as plastic or fabric. Preferably, the rod is constructed out of steel and arcuate shaped to resemble a bent fishing pole.

The wire is rigid and extends downward from the second end of the rod at an attached end to a free end, the free end being bifurcated for a length and culminating in a fused end. The attached end is hingedly connected to the second end of the rod using the fastener. The fastener may be tightened to restrict the movement of the wire. The notch further restricts the travel of the wire to a safe distance. The bifurcation extends from the free end with each side of the bifurcation culminating in an aperture adjacent to the fused end. In the preferred embodiment of the present invention, the wire is constructed out of rigid stainless steel for its ability to withstand high heat conditions.

The flipping mechanism includes a shaft, a plurality of skewers, a pair of rails, and a weight. The shaft is rotatably received and extends through the aperture of the bifurcation. The rails are attached to the ends of the shaft and are positioned perpendicular to and coplanar to the shaft, wherein the rails and shaft form a continuous I-shaped structure. The skewers are connected perpendicular and coplanar to the rails. The skewers culminate in a blunt end to allow for the attachment of food articles by puncturing the food article.

The weight is attached perpendicular to the shaft and positioned at the shaft center between the bifurcation and extends parallel to the rails culminating in a weighted end. The length of the weight is longer than the length of the portion of the rail extending from the shaft to its end and less than the length of the bifurcation, wherein the weight will rotate 180 degrees when the rod is moved in a jigging motion or turned latterly to move the location of weight relative to the wire. The weight acts as a counter balance and causes the mechanism to flip when the weight is jigged to a position that is beyond a position parallel to the wire.

The fused end of the wire acts as a stop and positioning element for the mechanism, wherein the weight rests on the fused end in a position perpendicular to the wire. This fused end causes the range of motion of the flipping mechanism to be fixed at 180 degrees. In the preferred embodiment of the present invention, the shaft is inserted into the apertures and the rails and weight are attached by welding them onto the shaft in the proper position. This creates a strong and robust assembly. Preferably, the rails and skewers are formed from one continuous piece of stainless steel wire that is bent to form a rectangular U-shaped structure with the skewers extending perpendicular at the end of the rail.

Although, the configuration as pictured includes a pair of skewers located on each side of the flipping mechanism, additional skewers may be added or used to create more attachment points for the food to be roasted. Preferably, the flipping mechanism is entirely constructed out of stainless steel components and welded in place, although other heat resistant materials may be used.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein.

DETAILED DESCRIPTION OF THE INVENTION

Figure 1:
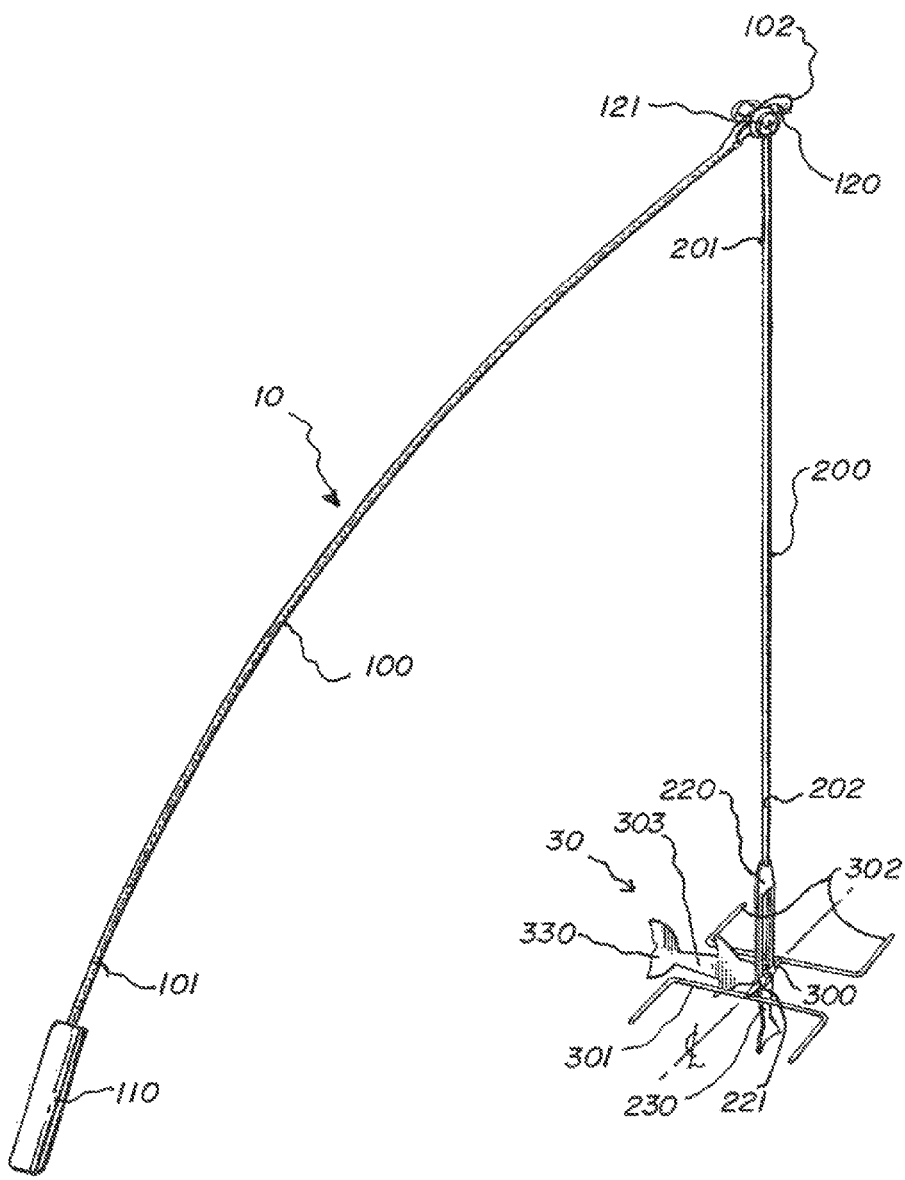
FIG. 1 is a perspective view of the fire fishing device, according to the present invention.
Figure 2:
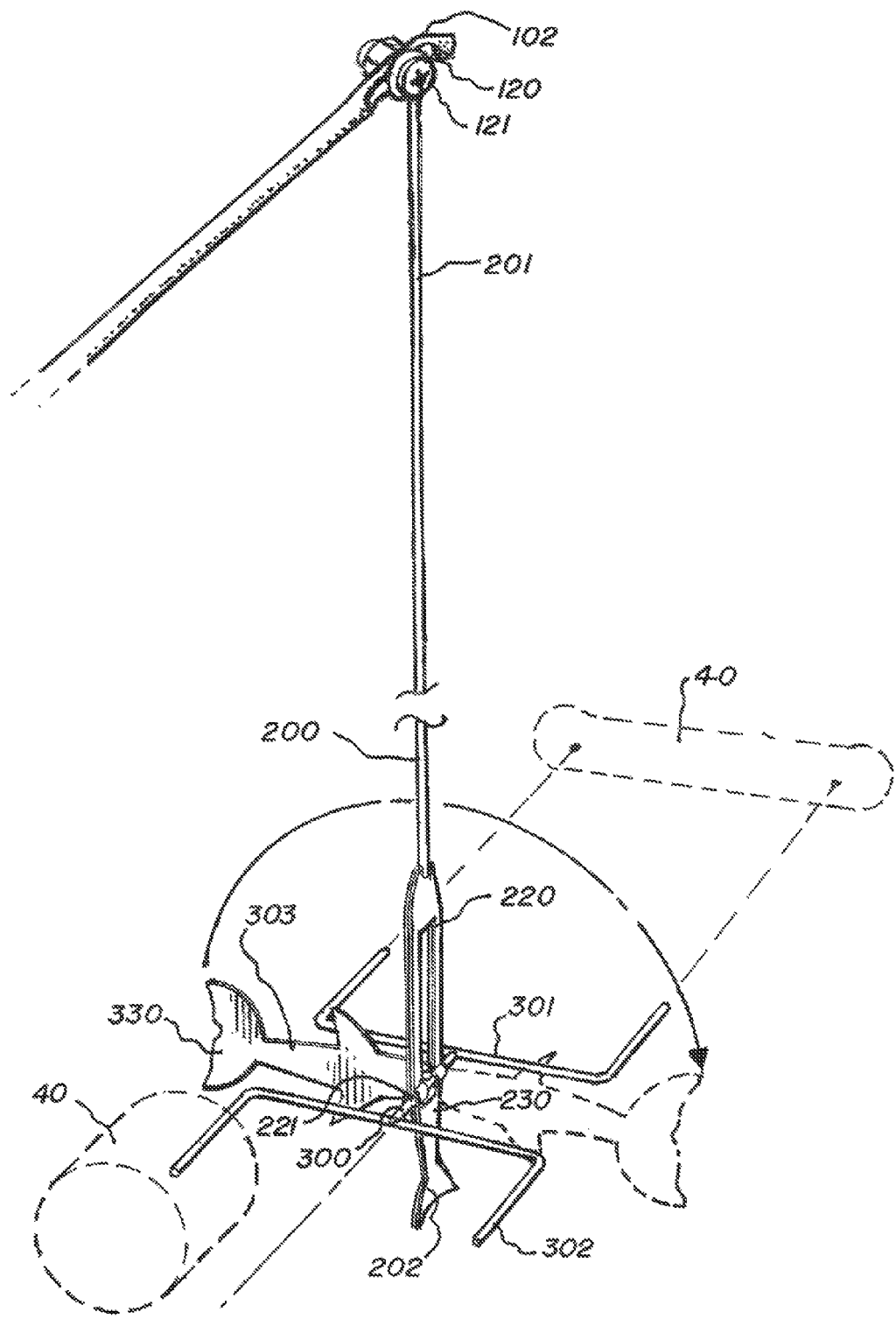
FIG. 2 is a perspective close-up view of the fire fishing device, according to the present invention.

Referring now to FIG. 1-FIG. 2 of the fire fishing device 10 according to the present invention, there is shown a rod 100, a wire 200 connected to the rod 100, and a flipping mechanism 30 connected to the wire 200 opposite the rod 100.

The rod 100 includes a first end 101 having a handle 110 and a second end 102 opposite the first end 101, the second end 102 having a notch 120 and a fastener 121. In the preferred embodiment of the present invention, the handle 110 is composed of wood so as to not get hot, although other materials that are resistant to heat may be used as well such as plastic or fabric. Preferably, the rod 100 is constructed out of steel and is an arcuate shape to resemble a bent fishing pole.

The wire 200 is rigid and extends downward from the second end 102 of the rod 100 at an attached end 201 to a free end 202, the free end 202 being bifurcated 220 for a length and culminating in a fused end 230. The attached end 201 is hingedly connected to the second end 102 of the rod 100 using the fastener 121. The fastener 121 may be tightened to restrict the movement of the wire 200. The notch 120 further restricts the travel of the wire 200 to a safe distance. The bifurcation 220 extends from the free end 202 with each side of the bifurcation 220 culminating in an aperture 221 adjacent to the fused end 230. In the preferred embodiment of the present invention, the wire 200 is constructed out of rigid stainless steel for its ability to withstand high heat conditions.

The flipping mechanism 30 includes a shaft 300, a plurality of skewers 302, a pair of rails 301, and a weight 303. The shaft 300 is rotatably received and extends through the aperture 221 of the bifurcation 220. The rails 301 are attached to the ends of the shaft 300 and are positioned perpendicular to and coplanar to the shaft 300, wherein the rails 301 and shaft 300 form a continuous I-shaped structure. The skewers 302 are connected perpendicular and coplanar to the rails 301. The skewers 302 culminate in a blunt end to allow for the attachment of food articles 40 by puncturing the food article 40.

The weight 303 is attached perpendicular to the shaft 300 and positioned at the shaft 300 center between the bifurcation 220 and extends parallel to the rails 301 culminating in a weighted end 330. The length of the weight 303 is longer than the length of the portion of the rail 301 extending from the shaft 300 to its end and less than the length of the bifurcation 220, wherein the weight 303 will rotate 180 degrees when the rod 100 is moved in a jigging up and down motion or turned latterly to move the location of the weight 303 relative to the wire 200. The weight 303 acts as a counter balance and causes the mechanism 30 to flip when the weight 303 is jigged to a position that is beyond a position parallel to the wire 200.

The fused end 230 of the wire 200 acts as a stop and positioning element for the mechanism 30, wherein the weight 303 rests on the fused end 230 in a position perpendicular to the wire 200. The fused end 230 causes the range of motion of the flipping mechanism 30 to be fixed at 180 degrees. In the preferred embodiment of the present invention, the shaft 300 is inserted into the apertures 221 and the rails 301 and weight 303 are attached by welding them onto the shaft 300 in the proper position. This creates a strong and robust assembly. Preferably, the rails 301 and skewers 302 are formed from one continuous piece of stainless steel wire that is bent to form a rectangular U-shaped structure with the skewers 302 extending perpendicular at the end of the rail 301.

Although, the configuration as pictured includes a pair of skewers 302 located on each side of the flipping mechanism 30, additional skewers 302 may be added or used to create more attachment points for the food to be roasted. Preferably, the flipping mechanism 30 is entirely constructed out of stainless steel components and welded in place, although other heat resistant materials may be used.

What is claimed is:

1. A device for roasting food over a heat source, the device comprising:
   a rod, the rod having a first end and a second end, the second end having a handle, the first end having a notch;
   a wire, the wire being rigid and a fixed length, the wire having an attached end and a free end, the attached end secured to the rod within the notch, the free end having a bifurcation, the bifurcation having a length longer than the length of a weight and culminating in a fused end, the bifurcation sides having an aperture adjacent to the fused end; and
   a flipping mechanism, the mechanism including:
      a shaft, the shaft rotatably received in the apertures of the bifurcation;
      a pair of rails, the rails centrally attached perpendicular to the shaft at the shaft ends;
      a plurality of skewers, the skewers extending perpendicular from the rails and culminating in an end to receive food items;
      the weight, the weight attached at the shaft middle between the bifurcation and extending to a length longer than the rail culminating in a weighted end, wherein the weight acts as a counter balance to flip the mechanism when the rod is tipped or moved up and down in a quick motion.

2. A device as in claim 1, wherein the pair of rails skewers are formed from a single piece of material.

3. A device as in claim 1, wherein the rod has an arcuate shape.

4. A device as in claim 1, wherein the wire is hingedly attached to the rod using a fastener, wherein articulation of the fastener restricts the movement of the wire.

5. A device as in claim 1, wherein the handle is wood.

6. A device as in claim 1, wherein the rod is steel.

7. A device as in claim 1, wherein the wire and flipping mechanism are constructed out of stainless steel.

8. A device for roasting food over a heat source, the device having the appearance a fishing rod and comprising:
   a rod, the rod being arcuate shaped and having a first end and a second end, the second end having a handle, the first end having a notch and a fastener;
   a wire, the wire being rigid and a fixed length, the wire having an attached end and a free end, the attached end secured to the rod within the notch using the fastener, the free end having a bifurcation, the bifurcation having a length longer than the length of a weight and culminating in a fused end, the bifurcation sides having an aperture adjacent to the fused end; and
   a flipping mechanism, the mechanism including:
      a shaft, the shaft rotatably received in the apertures of the bifurcation;
      a pair of rails, the rails attached perpendicular and coplanar to the shaft end at the rail center point;
      a pair of skewers, the skewers extending perpendicular from the rail ends and culminating in an end to receive food items;
      the weight, the weight attached at the shaft middle between the bifurcation and extending to a length longer than the rail and culminating in a weighted end, wherein the weight acts as a counter balance to flip the mechanism when the rod is tipped or moved up and down in a quick motion.

9. A device as in claim 8, wherein the handle is wood.

10. A device as in claim 8, wherein the rod is steel.

11. A device as in claim 8, wherein the wire and flipping mechanism are constructed out of stainless steel.

* * * * *